United States Patent [19]
van Eiji

[11] 3,855,399
[45] Dec. 17, 1974

[54] PROCESS OF PRODUCING HYDROGEN FLUORIDE FROM FLUOSILICIC ACID

[75] Inventor: A. Theodorus van Eiji, Terneuzen, Netherlands

[73] Assignee: Dow Chemical (Nederland) B.V., Terneuzen, Netherlands

[22] Filed: Aug. 16, 1973

[21] Appl. No.: 389,100

[52] U.S. Cl............ 423/483, 423/335, 423/341, 423/342, 423/472, 423/488
[51] Int. Cl............................................. C01b 7/22
[58] Field of Search ........... 423/483, 484, 485, 335, 423/341, 342, 472, 488

[56] References Cited
UNITED STATES PATENTS
3,773,907 11/1973 Blochl et al..................... 423/484

FOREIGN PATENTS OR APPLICATIONS
713,982 7/1965 Canada............................ 423/485

Primary Examiner—Edward Stern
Attorney, Agent, or Firm—Stephen Hoynak

[57] ABSTRACT

Hydrofluoric acid is prepared from fluosilicic acid (FSA) by feeding aqueous fluosilicic acid into a reactor where it is mixed with monoethylene or propylene glycol or diethylene glycol, in sufficient quantity to provide a (HF/FSA + $H_2O$) ratio of from about 4 to about 6, at a temperature which will vaporize substantially all the $SiF_4$. The glycol is then sent to a still where the HF and small amounts of water are stripped. The aqueous HF is passed to a still from which anhydrous HF is recovered and aqueous HF may be recycled to the reactor.

7 Claims, 1 Drawing Figure

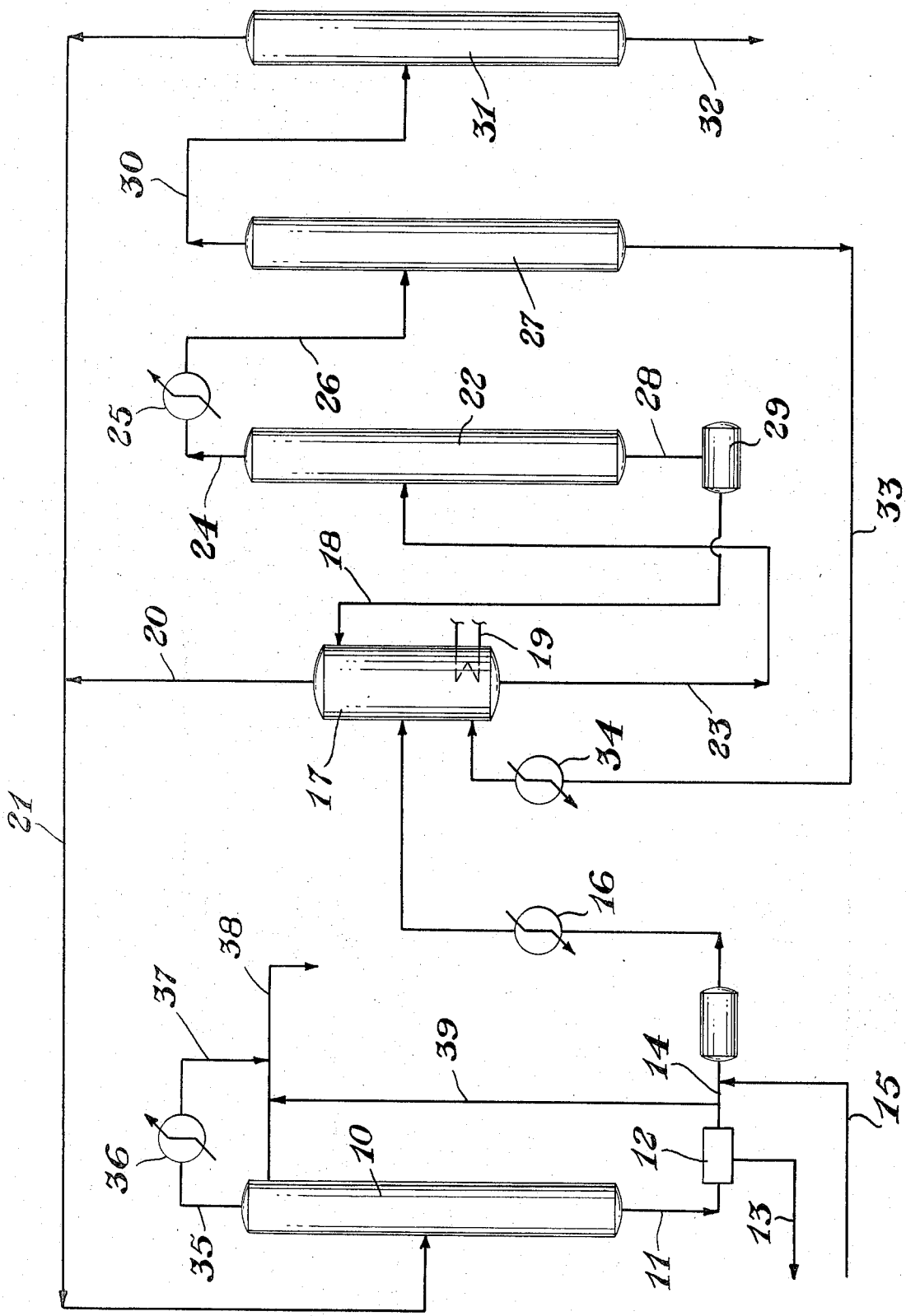

PROCESS OF PRODUCING HYDROGEN FLUORIDE FROM FLUOSILICIC ACID

BACKGROUND OF THE INVENTION

For many years substantially the sole source of HF has been the fluorspar from which HF was obtained by reaction with sulfuric acid. However, sources of high assay fluorspar are becoming scarce. In addition, the reaction in which HF is produced also results in the formation of a by-product calcium sulfate or bisulfate for which a market must be found or a disposal problem results. This process also employs large quantities of sulfuric acid, which adds to the cost of the HF.

More recently a proposed process for recovering HF from fluosilicic acid consists of first precipitating with ammonia, removal of silica by filtration, reacting the filtrate with lime to form calcium fluoride and converting the fluoride to HF.

In another proposed process fluosilicic acid is first neutralized with lime to form calcium fluoride and water, silica is added until there is a 1 to 1 mole ratio of silica and lime. The precipitate formed is dried and fed to a kiln and heated to 1,050°C. It is contacted at this temperature with water vapor. The condensate, an aqueous solution of HF is reacted with NaF to form sodium bifluoride. The latter is recovered, dried and then heated to 400°C. to form anhydrous HF.

A process described in Canadian Pat. No. 713,982 employs aqueous fluosilicic acid as a source of anhydrous HF. The fluosilicic acid is fed to a reactor and the effluent therefrom is passed into a polyglycol or glycol ether absorbing zone. In this zone most of the $SiF_4$ and water pass overhead and are recycled. The HF absorbed by the polyglycol or glycol ether contains a fair amount of $SiF_4$. The effluent from the absorption zone passes into second zone into which a water-HF azeotrope is fed. The azeotrope aids in stripping $SiF_4$ from solution. The overhead from the second zone is recycled to the absorption zone. Bottoms effluent from the second zone is passed into a third zone into which a stripping vapor is passed. The vapor when condensed is immiscible with HF. Stripping agents are nonpolar compounds. Specifically mentioned are diphenyl oxide or naphthalenes. In an example, heptane was employed as a stripping agent. The aqueous HF is then converted to anhydrous acid, which is recovered, and a water-HF azeotrope, which is recycled to the second zone.

SUMMARY OF THE INVENTION

This invention relates to a method for obtaining HF from aqueous fluosilicic acid. The method comprises commingling aqueous HF and fluosilicic acid ($H_2SiF_6$) with at least one of ethylene glycol, propylene glycol or diethylene glycol (mixtures can be used) at a temperature sufficiently high to vaporize substantially all the $SiF_4$ in the fluosilicic acid and some of the water, but insufficiently high to vaporize the HF which is dissolved in the glycol. The glycol containing HF in solution is fed to a column in which the HF and water are separated overhead. The glycol is returned for commingling with additional aqueous HF-fluosilicic acid feed stock. The aqueous HF obtained from the stripping column may be sent to storage or it can be converted to anhydrous and aqueous HF. The aqueous HF is recycled to the glycol treating step.

DETAILED DESCRIPTION OF THE INVENTION

Referring to the drawing, 10 is a tower for converting $SiF_4$ to fluosilicic acid and $SiO_2$ by reaction with water. The slurry which forms is passed through line 11, to filter 12, where silica is separated from the fluosilicic acid. The solid silica is removed through line 13. Aqueous fluosilicic acid is fed to line 14, where it can be combined with another aqueous fluosilicic acid feed stream from line 15. The temperature of the combined feed is adjusted in heat exchanger 16 to from about ambient to about 115°/120°C., before entering absorber 17. Ethylene glycol is fed to the absorber through line 18. A heating unit 19, located near the base of the absorber is used to provide a temperature of about 120°–130°C. at the top of the absorber and about 175°–190°C. in the bottom portion. The $SiF_4$ formed by disproportionation of the fluosilicic acid and a portion of the water are removed as overhead through line 20, and returned to tower 10, through line 21.

The glycol stream is fed to column 22, through line 23. This stream contains the dissolved HF, some water and only traces of fluosilicic acid. The weight ratio of HF to fluosilicic acid plus water ranges from about 4–6.

In column 22, substantially all the HF and most of the water are removed overhead through line 24, enter condenser 25 and line 26, from which the aqueous HF mixture is fed to column 27. In column 22 conditions are controlled for vacuum or atmospheric pressure operations to provide an overhead stream in which the weight ratio of HF to water is between 10 and 15.

Bottoms from the column 22 contain about 97–98.5 percent ethylene glycol, propylene glycol or diethylene glycol with the remainder being essentially water. The glycol passes through line 28 to tank 29 from which it is fed back to absorber 17 through line 18.

Column 27 is operated to remove substantially anhydrous HF through line 30, from which it is fed to column 31. In the latter, traces of lights, such as $SiF_4$ are removed overhead and enter line 21 for recycle to tower 10. Substantially anhydrous HF is removed as a bottoms stream through line 32 and sent to storage.

The bottoms stream from column 27 passes through line 33 into heat exchanger 34, from which it is returned to absorber 17.

Tower 10 is operated so that water in excess of that needed to convert $SiF_4$ to fluosilicic acid is removed through line 35 and passed into condenser 36, and then into line 37. A portion of the water is returned to the tower as reflux and the remainder is removed through line 38. Line 39 which connects lines 14 and 38 is used as a by-pass for recycling fluosilicic acid to the tower as reflux, and to maintain a proper ratio of freshly prepared fluosilicic acid and aqueous fluosilicic acid. Preferably, the ratio of freshly prepared fluosilicic acid to aqueous fluosilicic acid in the feed to absorber 17 is maintained at about two to one.

EXAMPLE

Twenty-three hundred weight parts of ethylene glycol are fed into the top of absorber 17. Fluosilicic acid which is vaporized in heat exchanger 16 and aqueous HF which is vaporized in heat exchanger 34 are fed into the absorber at a rate of about 1,200 g. and 158 g. per hour, respectively. The temperature in the absorber is maintained at an average (top temperature + bottom temperature divided by 2) of about 150°C. by means of the heating member 19. The pressure in the absorber is at about 1 atmosphere. Vapors from the absorber containing substantially all the SiF$_4$ formed and some water were passed through lines 20–21, to tower 10 where silica and fluosilicic acid are formed. The silica is filtered from the fluosilicic acid and water is evaporated and removed overhead. The temperature in tower 10 is maintained at about 60°C. The fluosilicic acid from tower 10 is mixed with an aqueous fluosilicic acid stream, such, as for example, is obtained from phosphoric acid production. As indicated above, the weight ratio of freshly prepared fluosilicic acid to the aqueous fluosilicic acid is about 2.

The ratio of HF to fluosilicic acid plus water in the feed to the absorber 17 is about 0.005.

The ethylene glycol stream removed from the bottom of absorber 17 has an HF to fluosilicic acid plus water ratio of about 4–6, with only traces of fluosilicic acid, usually not greater than about 0.15 weight percent and generally in the range of 500 to 2,000 ppm.

The ethylene glycol stream is fed to column 22 which is operated at atmospheric pressure or reduced pressure and at a bottom temperature of about 190°–120°C. The ethylene glycol stream leaving column 22 contains about 98.5 percent glycol with the remainder being substantially water. Only traces of HF are present.

The overhead aqueous HF stream from column 22 is then dehydrated in column 27, as previously described, and the bottom aqueous HF stream from the latter column is recycled to the absorber. It is apparent that the HF need not be dehydrated if there is a need for an aqueous HF solution. A light fraction is separated from the anhydrous HF in column 31 and returned to tower 10.

A yield of anhydrous HF in the process was 1,250 weight parts per hour.

I claim:

1. A method of preparing hydrofluoric acid from fluosilicic acid comprising
    a. commingling in an absorber at least one glycol of the group consisting of ethylene glycol, propylene glycol or diethylene glycol with aqueous fluosilicic acid or a mixture of aqueous fluosilicic acid and a minor quantity of aqueous hydrofluoric acid while maintaining a temperature of from about 120° to about 130°C. at the top of the absorber, and from about 175° to about 190°C. in the bottom portion, thereby disproportionating the fluosilicic acid into silicon tetrafluoride and hydrofluoric acid,
    b. removing an overhead stream containing substantially all of the silicon tetrafluoride and some water from the top of the absorber,
    c. feeding the silicon tetrafluoride and water to a reactor and thereby convert the silicon tetrafluoride to aqueous fluosilicic acid and silicon dioxide, and recycling the fluosilicic acid to step a,
    d. passing the glycol enriched with aqueous hydrofluoric acid from step a into a distillation column,
    e. distilling substantially all of the hydrofluoric acid from the glycol,
    f. recycling the glycol to the absorber of step a,
    g. converting the hydrofluoric acid of step e into aqueous and anhydrous fractions and returning the aqueous fraction of step g to the absorber of step a.

2. The method of claim 1 in which the ratio of hydrofluoric acid to fluosilicic acid plus water in the glycol stream, removed from the absorber is from about 4 to about 6.

3. The method of claim 1 in which the ratio of hydrogen fluoride to fluosilicic acid plus water in the feed to the absorber is about 0.005.

4. The method of claim 1 in which temperature in the distillation column for distilling hydrofluoric acid and water from the glycol is from 120°–190°C.

5. The method of claim 1 in which the glycol is ethylene glycol.

6. The method of claim 1 in which the glycol is propylene glycol.

7. The method of claim 1 in which the glycol is diethylene glycol.

* * * * *

PO-1050
(5/69)

UNITED STATES PATENT OFFICE
CERTIFICATE OF CORRECTION

Patent No. 3,855,399               Dated December 17, 1974

Inventor(s)  A. Theodorus van Eijl

It is certified that error appears in the above-identified patent and that said Letters Patent are hereby corrected as shown below:

In the first column of the Abstract Page, under United States Patent and the Title (54), the inventor's name has been misspelled. The inventor's name should read van Eijl and A. Theodorus van Eijl, not van Eiji.

Signed and sealed this 29th day of April 1975.

(SEAL)
Attest:

RUTH C. MASON
Attesting Officer

C. MARSHALL DANN
Commissioner of Patents
and Trademarks